United States Patent Office 2,916,699
Patented Dec. 8, 1959

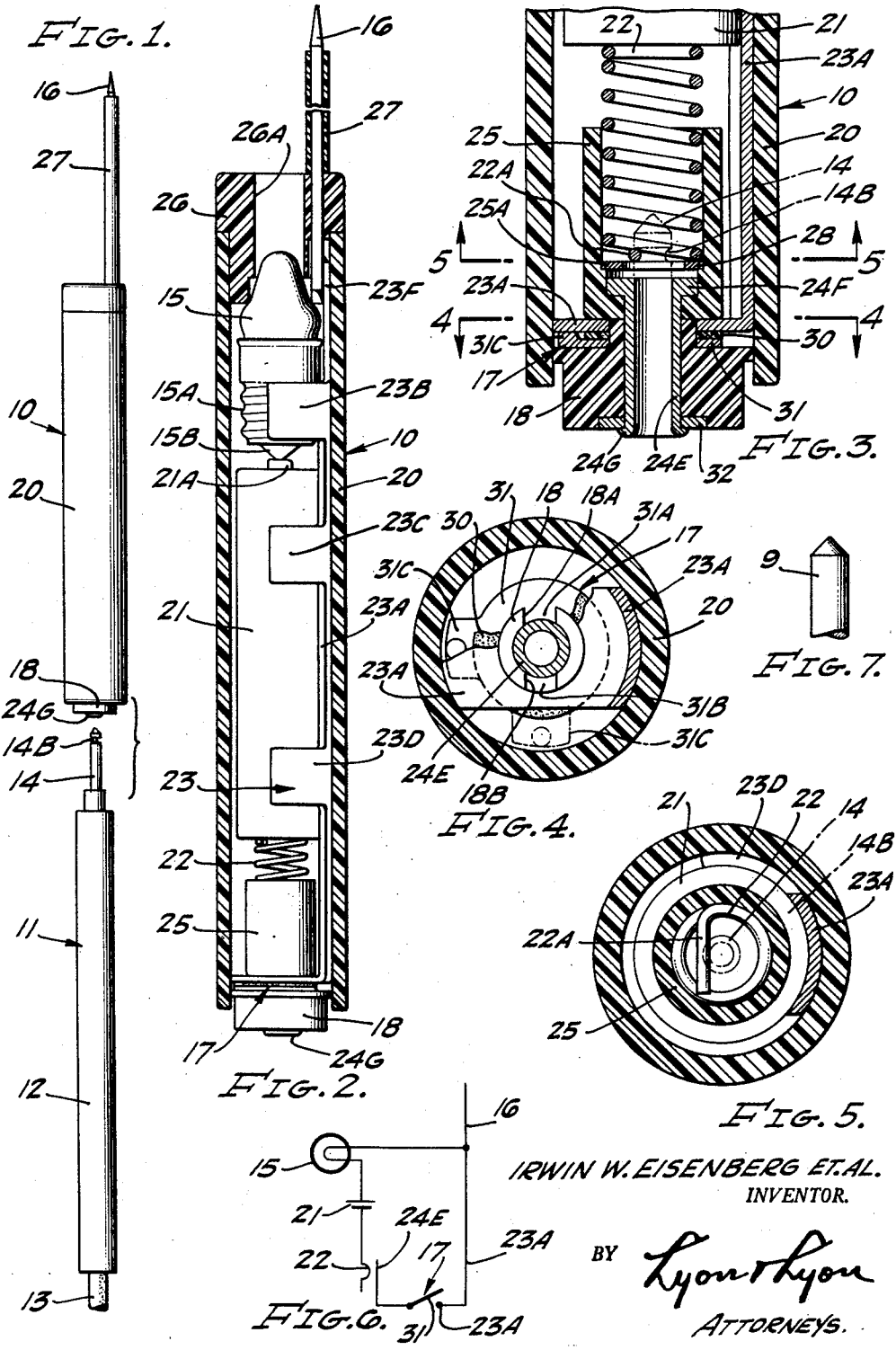

2,916,699

COMBINATION PROBE AND CONTINUITY TESTER

Irwin W. Eisenberg, Pasadena, Edmond W. Carlson, Arcadia, Kenneth T. Love, Azusa, Bernie H. Stadler, Puente, Steve J. Costantino, Covina, Leo W. Trammell, Los Angeles, and Clarence Heck Dibble, Pasadena, Calif., assignors to Phaostron Instrument and Electronic Company, South Pasadena, Calif., a corporation of California Application September 25, 1956, Serial No. 611,889

9 Claims. (Cl. 324—72.5)

The present invention relates to an arrangement for use with electrical testing leads or probes of the type commonly associated with testing equipment such as, for example, volt, ohm milliammeter, vacuum tube volt meter, oscilloscopes, and the like; and the present application is in the form of a continuation-in-part of our earlier filed application Serial Number 600,939, filed July 30, 1956 and assigned to the same assignee.

In general, the present arrangement is in the form of an adapter which provides an extension for existing test leads, and an important feature of the same is that it provides a source of illumination directed onto the particular spot in the circuitry being tested.

As is well known, electrical apparatus such as radio, radar and audio equipment is usually wired in a compact form, and the physical layout involves usually a jumble of interconnected resistances, condensers, coils, tube sockets, tie points, and the like. Some of such components may, indeed, be crammed in locations that are not conveniently visible due to the shape of the chassis and overlying components. Thus, persons confronted with the task of checking out, testing or servicing electronic equipment of this nature have found it inconvenient and sometimes confusing in placing a test probe at critical points in the electrical circuitry.

The use of the present arrangement for measuring voltages, currents, impedances obviates these difficulties in that it illuminates the point in the circuitry under investigation and forms a convenient extension when, as is often the case, the chassis is a "deep" chassis.

In accordance with an important feature of the present invention, the arrangement may not only be used in facilitating measurements but also as a continuity checker.

A general object, therefore, of the present invention is to provide a device which facilitates the testing of electrical equipment.

Another general object of the present invention is to provide a device which is usable with existing test leads for facilitating the testing of electronic equipment.

A specific object of the present invention is to provide an illuminated test probe which is useful also as a continuity checker.

Another specific object of the present invention is to provide an improved extension for existing test probes.

Another specific object of the present invention is to provide an improved test probe which not only provides a source of illumination but also provides a convenient extension.

Another specific object of the present invention is to provide test apparatus which incorporates a switch for converting the apparatus to function as an illuminated probe or as a continuity checker.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a view in elevation of an arrganment embodying features of the present invention shown in detached relationship with respect to the probe of a conventional test lead.

Figure 2 is a transverse sectional view taken generally along the longitudinal axis of the device shown in the upper portion of Figure 1.

Figure 3 is a sectional view showing in enlarged form the lower part of the device shown in Figure 2.

Figures 4 and 5 are sectional views taken substantially on the lines 4—4 and 5—5 in Figure 3.

Figure 6 illustrates, in schematic form, the electrical circuitry of the device shown in Figure 2.

Figure 7 illustrates another form of conventional probe tip which may be used in conjunction with the device illustrated in Figures 1 and 2.

The device 10 incorporating features of the present invention may be quickly attached to and detached from a conventional test probe 11 to form an insulated extension of the test probe 11.

The test probe 11, as illustrated in Figure 1, is of conventional construction and involves generally an insulated sleeve 12 through which a flexible insulated conductor 13 extends, such insulated conductor being electrically connected to the metal contact pin 14.

The test pin 14 may either be a cylindrical pin with a rounded end, as shown at 9 in Figure 7, or as illustrated in Figure 1, the contact pin 14 may be provided with an annular grooved portion 14B.

The device 10 is adapted to seat the contact pin 14 (Figure 1) so as to not only mechanically secure the two elements 10 and 11 together but also to provide an electrical connection with elements in the device 10. Such connection conditions an energizing circuit for the lamp bulb 15 (Figures 2 and 6) and serves also to connect the contact pin 14 to the contact pin 16 through a rotary switch 17. The contact pin 14 may have an annular grove 14B or be a straight contact pin 9, as shown in Figure 7.

The device 10 comprises a cylinder or barrel 20 of insulating material which slips over an assembly and serves to house the lamp bulb 15, battery 21, spring 22, and a specially fabricated conducting strip assembly 23. The barrel 20 is closed at one end by an apertured plug 26 of insulating material, the other end of the barrel 20 having a rotary knob 18 extending outwardly therefrom for manually operating the switch 17 so that the device may be conditioned for use either as an illuminated probe extension or as a continuity tester, as desired.

The assembly 23 comprises generally a metallic strip 23A which extends substantially the full length of the barrel 20 and which has formed integrally thereto the three spaced spring clips 23B, 23C and 23D. The spring clip 23B releasably retains a standard lamp bulb 15 and provides electrical connection with the metallic screw-threaded base 15A of the bulb 15. The other two spring clips 23C and 23D releasably secure the battery 21 and engage the outer cylindrical insulated portion of the battery 21.

The assembly 23 includes also the metallic socket 24E in the form of a rivet which passes through an apertured portion of the bent end of the metallic strip 23A and also through a specially formed ferrule 25 of insulating material, the ferrule 25 being secured to the bent end of the strip 23A by the metallic socket 24E by the following construction.

It is noted that the socket 24E has a flanged portion 24F engaged with the apertured base portion of the ferrule 25 and has its outer end deformed at 24C to retain an assembly of elements on the bent end of the member 23A. Such assembly comprises, in this order, the ferrule 25, element 23A, insulating washer 30, switch contact 31, knob 18 and washer 32. By this expedient the knob 18 is rotatably mounted on the metal element or supporting frame 23A. The contact element 31 is keyed to the knob 18 so as to rotate therewith and contact the metallic element 23A. The elements 31 and 23A thus form the contact elements of the previously designated switch 17 as indicated in Figure 6.

The switch element 31 as shown in Figure 4 has a pair of diametrically disposed portions 31A, 31B that are in contact with metal contact sleeve 23E and such portions 31A, 31B extend into slotted portions 18A, 18B of the knob so that such contact 31 rotates with the knob 18. Such contact member 31 has an outwardly extending portion 31C which upon rotation of the knob 18 is brought into or out of contact with the metallic element 23A.

The ferrule 25 is provided with an internal annular shoulder 25A which seats the metallic washer 28. The washer 28 provides a seat for one end of the coil compression spring 22, and the other end of the spring 22 bearing against the metallic end of the battery 21, so that the other contact 21A of the battery is pressed into good electrical contact with the insulated lamp bulb contact 15B. The assembly 23 includes also a conducting cylindrical portion 23F formed integrally with the strip 23A and providing a mechanical and electrical connection to the inner end of the contact pin 16 as, for example, by soldering.

The contact pin 16 passes through plug 26 and its extended portion is covered with the sleeve 27 of insulating material. The plug 26 is provided also with the apertured portion 26A to provide a light passage serving to direct light from the lamp 15 in the general direction of the tip of the contact pin 16.

The spring 22 is of special construction for accomplishing both mechanical and electrical connection to the end of the contact pin 14. For this purpose the spring 22, comprising a plurality of convolutions of spring wire, terminates with a portion 22A. As seen in Figures 3 and 5, the spring portion 22A extends inwardly in a generally radial direction but is off-centered with respect to the central apertured portion of the washer 28 and the centrally apertured portion of the socket 24E. However, a portion of the inwardly bent spring end 22A overlies the centrally apertured portion of the washer 28 so that the spring end 22A is contacted by the inner end of the contact pin 14 when and as the same is inserted in position illustrated in Figure 3.

When and as such spring end 22A is engaged by the contact pin 14 in the process of assembling the two elements 10 and 11 together, such spring end 22A is cammed in the radial direction by the pin 14 so as to achieve a resilient connection between the spring 22 and the contact pin 14. In other words, the spring 22 is distorted somewhat by the pin 14, and this distortion is used to advantage in providing both a mechanical and electrical connection. Thus, the spring end 22A is resiliently pressed against the inner end of the pin 14 so as to frictionally hold the two elements 10 and 11 together and also to press the pin 14 against the wall of socket 24E.

Thus, when the two elements 10 and 11 are assembled, an electrical connection is automatically established between the contact pin 14 and the contact pin 16 through a path which includes: the contact pin 14, the socket 24E, the switch 17 which includes the strip 23A, the cylindrical portion 23F and the pin 16. Also, an energizing circuit for the lamp bulb 15 is automatically established, and such energizing circuit extends through the following path: from pin 14, the metallic spring 22, the battery 21, the lamp bulb 15, spring clip 23B, strip 23A, switch 17 which includes the bent end of strip 23A, socket 24E and pin 14. This circuit is represented also in Figure 9.

Thus, when the elements 10 and 11 are assembled, and the switch 17 is closed, the probe 16 is fully effective for measurements, and the general vicinity of the end of probe 16 is illuminated; and when the elements 10 and 11 are disassembled, as illustrated in Figure 1, the lamp bulb 15 is de-energized and the life of the battery 21 is preserved.

When the switch 17 is opened, the device is converted to a continuity checker. The lamp 15 is illuminated only when the probe 16 and the lead 13 (Figure 1) are interconnected through a closed circuit of substantially zero resistance. When this condition is achieved, the lamp 15 is illuminated and its illumination serves as an indication of a closed external circuit.

It is thus noted that the particular construction of the spring 22 and its relationship with respect to the other elements provides a simple and inexpensive jack construction for completing two electrical circuits.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A probe comprising a generally tubular member, a contact pin carried on one end of said member, a light source mounted in said member and arranged to illuminate the general vicinity of said contact pin, a socket mounted on the other end of said member arranged to receive a second pin, and means effective upon placement of said second pin in said socket for energizing said source and establishing an electrical connection between the first-mentioned pin and said second pin and switching means for preventing said light source from becoming energized.

2. A probe comprising an insulated barrel, an insulated plug at one end of said barrel, a contact pin extending through said plug, a conducting strip in said barrel and extending substantially the full length thereof, one end of said strip being in electrical contact with said pin, a lamp bulb, a metallic clip mounted on said strip and mechanically and electrically connected to one terminal of said lamp bulb, said plug having an apertured portion through which light from said light bulb may pass in the general direction of said pin, a battery in said barrel having one terminal thereof connected electrically to the other contact of said lamp bulb, clip means mounted on said strip and releaseably securing said battery in position, a socket formed on the other end of said strip and extending through an apertured portion in one end of said barrel, an insulated ferrule mounted on the other end of said strip, said ferrule having an annular internal shoulder, a metallic washer on said shoulder, a coil compression spring having one of its ends bearing against said washer and the other one of its ends bearing against the other contact of said battery, said spring having its end adjacent said washer provided with a generally radially extending portion which overlies the apertured portion of said washer, said spring being metallic and having said end thereof adapted to resiliently contact a pin in circuit through said socket, said socket being of conducting material and switch means for selectively connecting said bulb to said bulb socket.

3. A probe as set forth in claim 2 in which an insulated sleeve is mounted on said plug and insulates a substantial length of the first-mentioned contact pin.

4. A probe comprising an elongated member having a contact pin mounted on one end thereof, a socket for receiving a second contact pin in the other end of said member and means automatically effective upon insertion of said second pin in said socket for establishing an electrical connection between the first-mentioned pin and said second pin and for illuminating the general vicinity of the first-mentioned pin and means partially disabling the last mentioned means to allow connection between said first and second pins but preventing said last mentioned means from illuminating the vicinity of said first pin.

5. A probe comprising an elongated member having a contact pin mounted on one end thereof, a contact strip in said member, and extending substantially the full length of said member, said contact strip being connected electrically to said pin, a light bulb, a battery, means on said strip for releasably securing said lamp bulb and said battery within said member, an electrically conducting socket in the other end of said member and electrically connected to said strip, switch means, and spring means in said member for engaging a contact pin inserted in said socket for pressing the last-mentioned pin into engagement with said socket and for establishing an electrical circuit through said switch means to said bulb and said battery.

6. A probe comprising an elongated member having an open end, a plug releasably secured in said one end, said plug having two apertured portions, a contact pin extending through one of said apertured portions, a conducting strip in said member and extending substantially the full length thereof, one end of said strip being electrically connected to said contact pin, a lamp bulb mounted adjacent the other apertured portion in said plug for illuminating the general vicinity of the end of said contact pin, means on said strip for releasably securing said bulb on said strip in electrically conducting relationship, a battery in said member, means on said strip for releasably securing said battery on said strip, an insulated ferrule, a generally tubular conducting socket in the form of a rivet extending through an apertured portion in the other end of said member and securing said ferrule to said strip, said socket being electrically connected to said strip, switch means connecting said socket to said bulb and battery, said ferrule being provided with an internal annular shoulder, a washer on said shoulder, a coil compression spring having one of its ends bearing against a contact of said battery with the other end of said spring bearing against said washer, said spring having the end thereof which is adjacent said washer provided with a generally radially extending portion which overlies the apertured portion in said washer.

7. A probe as set forth in claim 6 in which an insulated sleeve surrounds a substantial portion of said contact pin and is secured to said plug.

8. A combination probe and continuity tester comprising an elongated member, a contact pin on one end of said member, a switch on the other end of said member, a socket in said other end of said member, a source of illumination in said member, said switch being alternatively effective to connect and disconnect said socket to said source, said socket being connected to said contact pin.

9. A probe comprising an elongated member, a contact pin mounted on one end of the member, a socket on the other end of said member and electrically connected to said pin, a light source, a battery, said light source and battery being mounted in said member in a series circuit, one terminal of said series circuit being connected to said contact pin, the other terminal of said series circuit being normally disconnected, means effective upon insertion of a pin in said socket for connecting said other terminal of said series circuit to said socket and a switch for disconnecting said other terminal from said socket.

References Cited in the file of this patent

UNITED STATES PATENTS

| | | |
|---|---|---|
| 2,231,660 | Carlotti | Feb. 11, 1941 |
| 2,540,402 | Mosier | Feb. 6, 1951 |